United States Patent [19]

Duffty

[11] Patent Number: 4,953,492
[45] Date of Patent: Sep. 4, 1990

[54] WATER SUPPORTING AND PROPULSION SYSTEMS

[75] Inventor: Bryan Duffty, Gilroy, Calif.

[73] Assignee: FMC Corporation, Chicago, Ill.

[21] Appl. No.: 369,178

[22] Filed: Jun. 21, 1989

[51] Int. Cl.$^5$ ............................................... B60F 3/00
[52] U.S. Cl. .................................. 114/282; 114/284; 114/270; 440/38
[58] Field of Search ............... 114/270, 274, 278, 282, 114/284, 283, 285; 440/38, 53

[56] References Cited

U.S. PATENT DOCUMENTS

| | | | |
|---|---|---|---|
| 3,092,062 | 6/1963 | Savitsky | 114/280 |
| 3,183,871 | 5/1965 | Reder | 114/282 |
| 3,270,699 | 9/1966 | Bush | 114/280 |
| 3,343,513 | 9/1967 | Bader | 114/282 |
| 3,382,836 | 5/1968 | Hume | 114/270 |
| 3,420,204 | 1/1969 | Samuel | 115/1 |
| 3,809,005 | 5/1974 | Rodler, Jr. | 115/12 |
| 3,930,458 | 1/1976 | Krautkremer | 114/270 |
| 3,983,832 | 10/1976 | Kinder | 114/283 |
| 4,073,257 | 4/1978 | Rodler, Jr. | 115/12 |

OTHER PUBLICATIONS

An article entitled Hydrofoil appearing on pp. 426–428 of vol. 12 of Collier's Encyclopedia, published by Crowell, Collier and MacMillan, Inc., in 1966.

Primary Examiner—Sherman D. Basinger
Assistant Examiner—Stephen P. Avila
Attorney, Agent, or Firm—A. J. Moore; R. C. Kamp; R. B. Megley

[57] ABSTRACT

An improved watercraft and propulsion system is disclosed for moving a watercraft such as an amphibious vehicle or a speed boat from 0 velocity to speeds in excess of 20 miles per hour. Each watercraft includes water propulsion systems which are preferably pivotally mounted on or near the rear end of the watercraft for pivotal movement between a transversely aligned stowed position above the vehicle and an operative position within the watercraft and below the vehicle. Hydrofoils may be connected to the water propulsion system, and bow or transom flaps plus the planing hull of the vehicle aids in providing adequate lift when in the water.

14 Claims, 3 Drawing Sheets

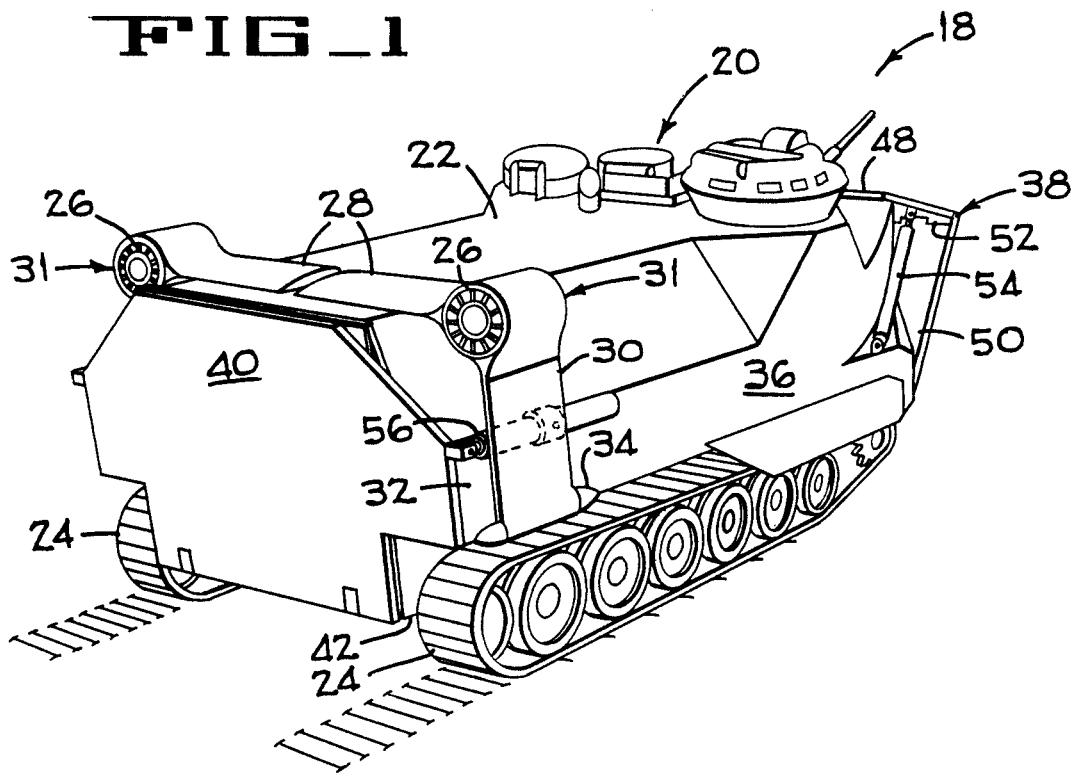
FIG_1
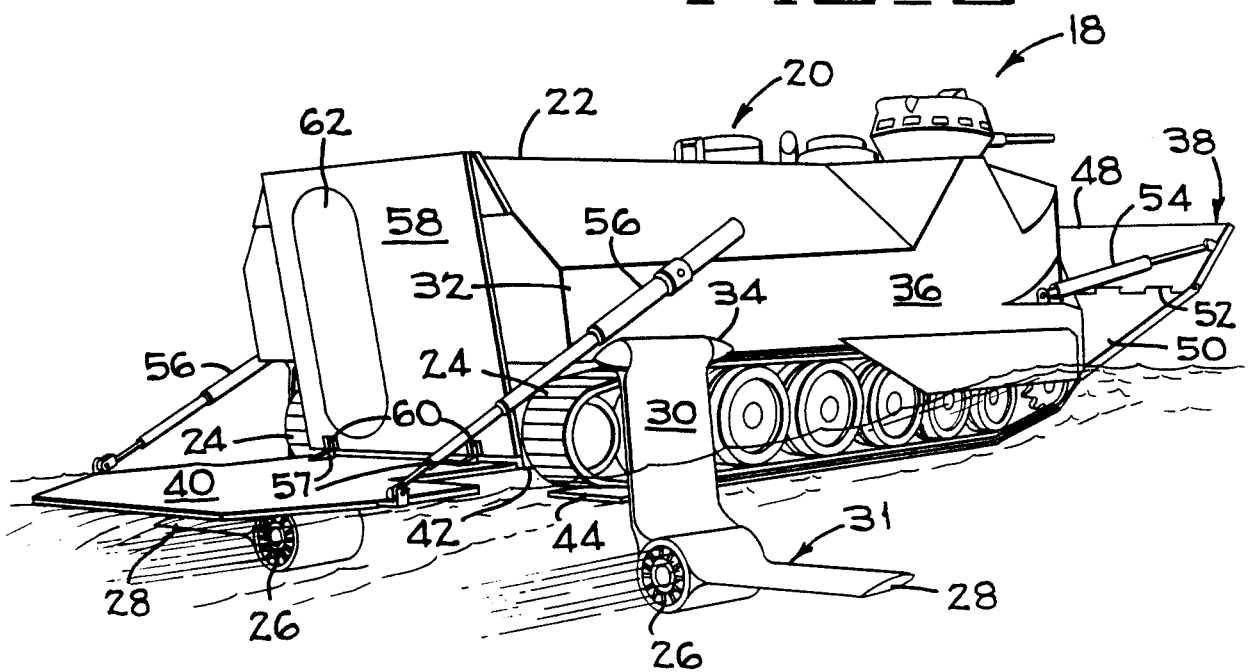
FIG_2

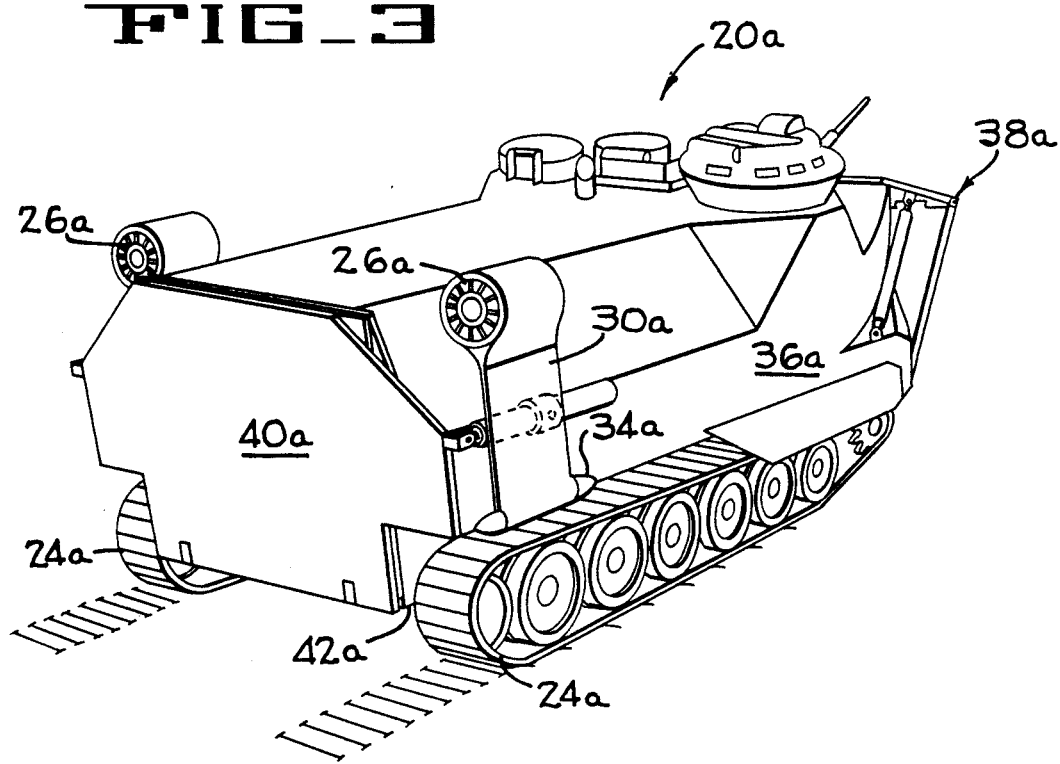
FIG_3
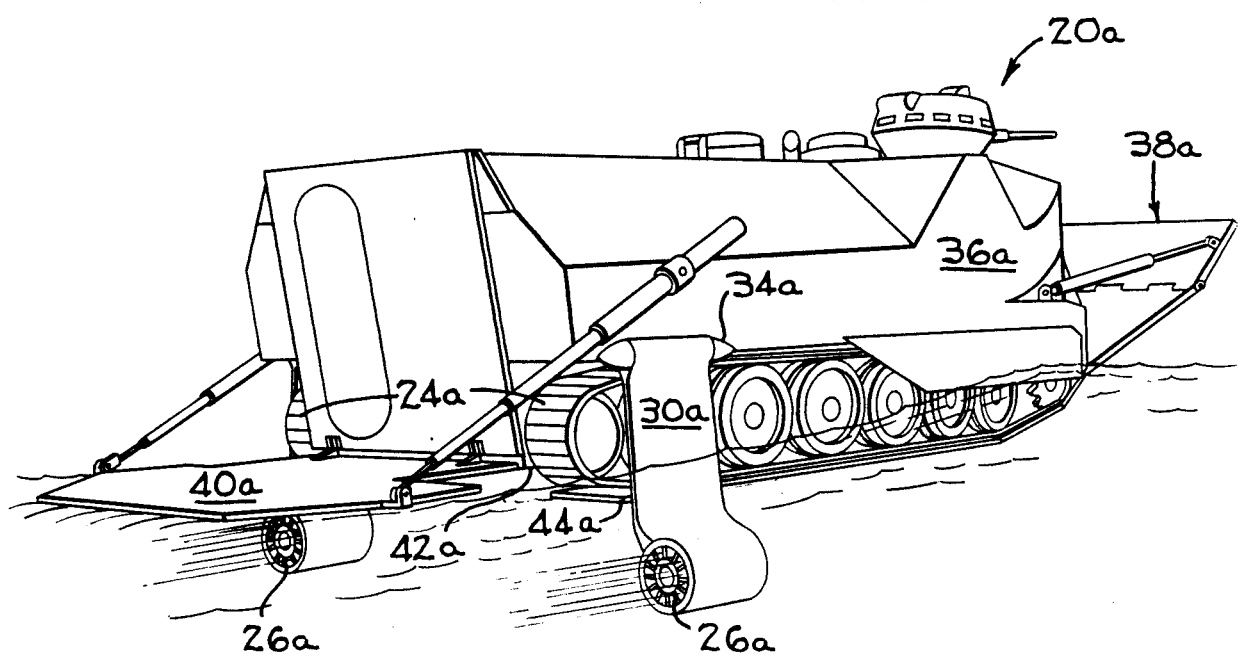
FIG_4

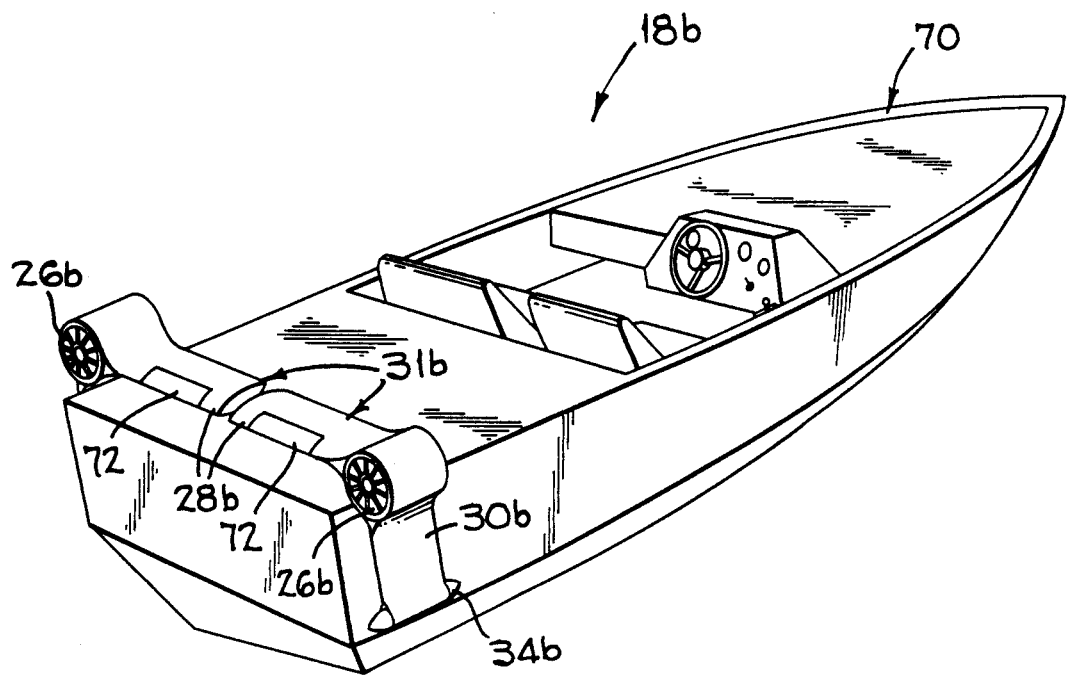
FIG_5
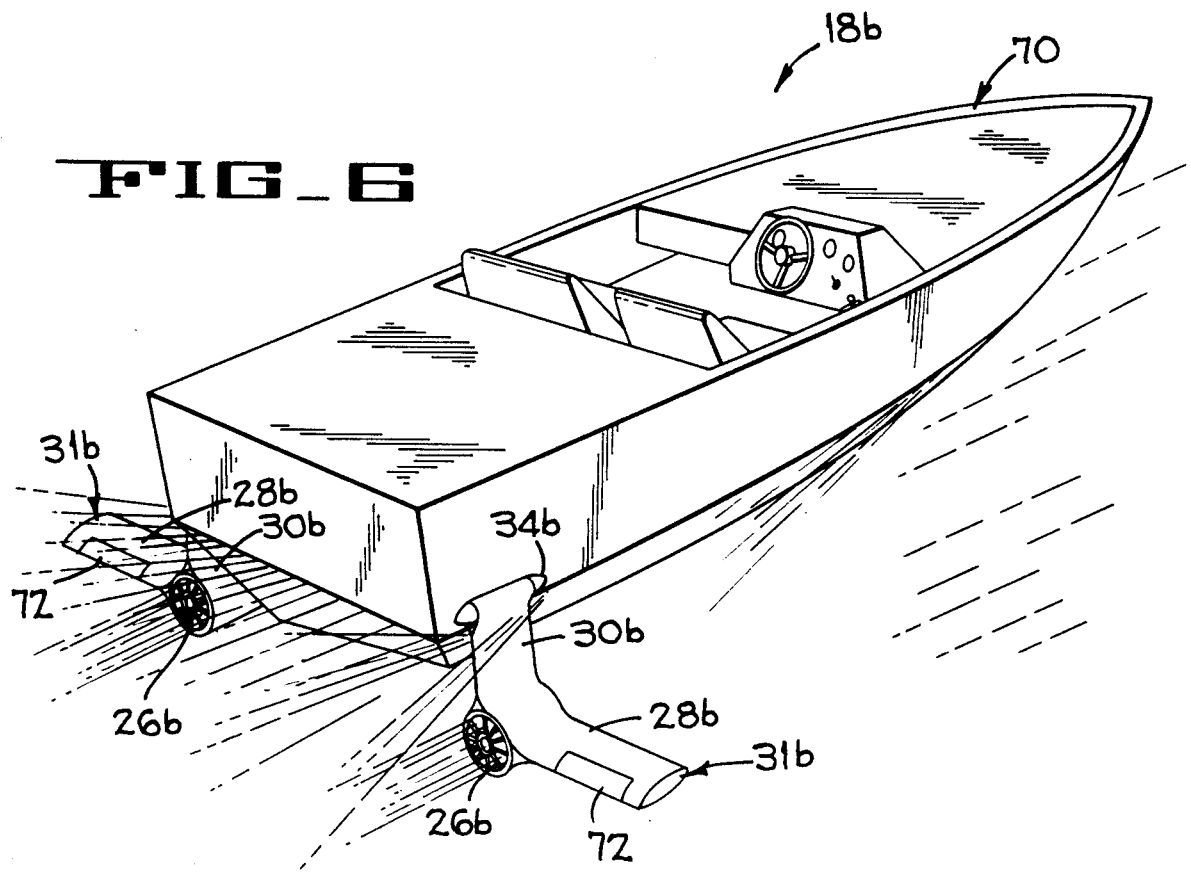
FIG_6

WATER SUPPORTING AND PROPULSION SYSTEMS

CROSS REFERENCE TO RELATED APPLICATIONS

The present application relates to Rodler, Jr. application Ser. No. 07/369,179 entitled WATER JET PROPULSION MODULE; Duffty et al application Ser. No. 07/369,173 entitled AMPHIBIOUS HYDROFOIL VEHICLE; and Duffty et al application Ser. No. 07/369,172 entitled INTEGRATED WATER PROPULSION AND HYDROFOIL SYSTEMS, which applications are presently assigned to the assignee of the present invention.

BACKGROUND OF THE INVENTION

The present invention relates to watercraft in general, and more specifically to amphibious vehicles which include bow flap and transom flaps and/or hydrofoils which may be adjusted between a land mode and a water mode.

DESCRIPTION OF THE PRIOR ART

Assignee's U.S. Pat. No. 3,420,204 to Samuel discloses a water jet reactive propulsion system which is capable of propelling tracked amphibious vehicles through water at slow speeds of about ten miles per hour.

U.S. Pat. Nos. 3,809,005 and 4,073,257 to Rodler, Jr. disclose two versions of water jet propulsion systems wherein the water intake ducts and water discharge ducts are connected by passages that require two approximately 180° reversals of directions of the propulsive water.

SUMMARY OF THE INVENTION

The improved watercraft supporting and propulsion systems of the present invention are primarily intended to propel a tracked amphibious vehicle in excess of 20 miles per hour when in their water modes, and be converted between their water modes and land modes when moving from water to land without stopping when under enemy fire. However, the watercraft supporting and propulsions may be incorporated on boats, ships, and other watercraft.

BRIEF DESCRIPTION OF THE DRAWINGS

FIG. 1 is a perspective of a watercraft in the form of an amphibious vehicle in its land mode and having hydrofoils and water propulsion units stowed in their inoperative land mode positions.

FIG. 2 is a perspective of the amphibious vehicle of FIG. 1 illustrating the hydrofoils, water propulsion units, and other components in their water modes.

FIG. 3 is a perspective of a modified form of the amphibious vehicle without hydrofoils in the land mode.

FIG. 4 is a perspective similar to FIG. 3 but illustrating the amphibious vehicle in the water mode.

FIG. 5 is a perspective of a boat having pairs of hydrofoils and water propulsion modules shown in their inoperative positions.

FIG. 6 is a perspective similar to FIG. 5 but illustrating the hydrofoils and water propulsion modules in their water modes.

DESCRIPTION OF THE PREFERRED EMBODIMENT

FIGS. 1 and 2 illustrate a watercraft 18 in the form of a tracked amphibious military vehicle 20 in its land mode and water mode, respectively. The vehicle includes a body 22 supported by tracks 24 which are propelled by a conventional engine and power train (not shown) within the vehicle for driving the tracks 24 and water propulsion modules 26, which modules are positioned on opposite sides of the vehicle. The water propulsion modules may be water jets as disclosed in the aforementioned Rodler, Jr. application, or may be a propeller driven propulsion module.

Each water propulsion module 26 is connected between a hydrofoil 28 and a mounting leg 30 to define a water propulsion and hydrofoil system 31, which mounting leg is connected to the rear end portion 32 of the vehicle by motors 34 (only one being shown) which are connected between associated side walls 36 (only one being shown) and the adjacent mounting leg 30. Each motor 34 includes means for locking the water propulsion and hydrofoil systems in either its water mode or land mode. Control means (not shown) within the vehicle allows an operator to move the hydrofoils 28 and water propulsion units 26 between the ground mode of FIG. 1 and the water mode of FIG. 2. It will be noted that the hydrofoils 28 are in transverse alignment, and extend about one-half of the width of the vehicle when in the land mode.

When in the water mode as shown in FIG. 2, additional lift is provided by a bow flap 38, a transom flap 40, a planing hull 42, and right and left track covers 44 (only the right track cover being shown) which are locked below the tracks when the vehicle 20 is in the water mode and below the planing hull when in the land mode.

As shown in FIGS. 1 and 2, the bow flap 38 is formed from two sections 48,50 connected together by an intermediate hinge 52. A lower hinge (not shown) pivotally connects the lower edge of the section 50 to the front of the vehicle at a level substantially the same as that of the planing hull 42. A pair of hydraulic cylinders 54 (only one being shown) extend between the body 22 of the vehicle 20 and moves the two section bow flap between the retracted land mode of FIG. 1 and the extended water mode of FIG. 2. Alternately, a rotary actuator (not shown) may be positioned between the planing hull 42 and the section 50 of the bow flap for raising and lowering the bow flap 38.

The transom flap 40 is movable between the stowed or land mode position illustrated in FIG. 1 and the water mode position illustrated in FIG. 2 by hydraulic cylinders 56 as illustrated in FIGS. 1 and 2; or may use rotary actuators (not shown) and rotary actuator hinges 57 between transom flap 40 and ramp 58. Although the transom flap 40 and bow flap 38 are illustrated as large flaps, it will be understood that smaller flaps may be all that is required. When in the land mode as shown in FIG. 1, the transom flap 40 acts as additional armor plate on the rear of the vehicle. A ramp 58 (FIG. 2) is pivoted to the rear of the amphibious vehicle 20 by hinges 60 for allowing large cargo to be easily moved into and out of the vehicle. A small door 62 (FIG. 2) is hinged to the ramp 58 to allow personnel to easily enter or leave the vehicle. It will be understood that the small door 62 and the ramp 58 are sealed in watertight engagement when closed in the water mode.

When the transom flap 40 is in its water mode as shown in FIG. 2, the flap is substantially an extension of the planing hull 42 of the vehicle thus providing additional lift to the amphibious military vehicle 20.

The right and left track covers 44 (FIG. 2) when in the water mode provide additional planing surfaces and minimize water drag caused by the uneven lower surface of the tracks 24.

FIGS. 3 and 4 illustrate a second embodiment of the amphibious military vehicle 20a in a land mode in FIG. 3 and a water mode in FIG. 4. The FIGS. 3 and 4 embodiments are the same as the first embodiment of the invention except that hydrofoils are omitted. Accordingly, parts of the second embodiment which are similar to those of the first embodiment will be assigned the same numerals followed by the letter "a".

The water propulsion module 26a are mounted on legs 30a which are pivoted between their stowed or inoperative positions shown in FIG. 3 and their operative positions shown in FIG. 4 by motors 34a connected between the adjacent side walls 36a of the vehicle 20a. Since hydrofoils are not used in the second embodiment of the invention, lift is provided by a bow flap 38a, a transom flap 40a, a planing hull 42a, and right and left track covers 44a (in response to the vehicle being propelled through water at relatively high speed). The track covers 44a are locked below the tracks 24a when the vehicle 20a is in the water mode as illustrated in FIG. 4, and below the planing hull 42a when in the land mode of FIG. 3.

FIGS. 5 and 6 illustrate a watercraft 18b in the form of a boat 70 which include two water propulsion and hydrofoil systems 31b shown in a stowed position in FIG. 5 and in a water mode in FIG. 6.

Since the hydrofoil system 31b is similar to that of the first embodiment of the invention, the same numerals used in the first embodiment followed by the letter "b" will be used to identify equivalent parts in the third embodiment of the invention. It will be understood, of course, that the size of the hydrofoils 28b, water propulsion module 26b, mounting legs 30b, and motors 34b may differ in size for different sizes of watercraft 18b.

Flaps 72 may be provided on the rear edges of the hydrofoils 28b. The flaps 72 may be pivotally actuated by control means in the watercraft 18b which pivotally move the right and left flaps 72 in opposite directions for aiding said watercraft to bank around turns at high speed.

From the foregoing description it will be apparent that each improved watercraft supporting and propulsion system of the present invention is mounted near the rear end of the watercraft, which watercraft may be a tracked military vehicle, boats, or similar watercraft. When a military vehicle is heavily loaded, at least bow flaps, transom flaps, and retractable hydrofoils are lowered to provide sufficient lift and propulsion to move the vehicle through water at a speed of at least 20 miles per hour. When mounted upon the rear portion of a watercraft, such as a speed boat, the hydrofoils and water propulsion units will propel the watercraft at speeds substantially faster than 20 miles per hour.

Although the best mode contemplated for carrying out the present invention has been herein shown and described, it will be apparent that modification and variation may be made without departing from what is regarded to be the subject matter of the invention.

What is claimed is:

1. A power driven watercraft having a longitudinal axis, comprising:
    means defining transversely aligned right and left water propulsion systems attached only to the rear portions of side walls of the watercraft and each supporting a water propulsion module, and each propulsion system including a single mounting leg and a hydrofoil extending substantially perpendicular to the associated mounting leg and defining an apex therebetween;
    first power means connected between said watercraft and associated ones of said mounting legs for moving said right and left propulsion systems transversely of said axis between an operative position within the water and a stowed position above the water; and
    second power means carried by said watercraft and disposed at associated ones of said apexes for driving said right and left water propulsion systems for propelling the watercraft up to a speed of at least 20 miles per hour when supported by water.

2. An apparatus according to claim 1 wherein said watercraft is a boat.

3. An apparatus according to claim 1 wherein said watercraft is a tracked amphibious vehicle.

4. An apparatus according to claim 1 and additionally comprising transversely aligned hydrofoils secured to associated ones of said transversely aligned water propulsion systems, which hydrofoils extend outwardly of said rear portion of said sidewalls of the watercraft when in operative position in the water and extending transversely inward of the watercraft at an elevation in excess of the height of the rear portion of the watercraft when in an inoperative stowed position.

5. An apparatus according to claim 1 wherein said water propulsion systems are linear flow water jets.

6. An apparatus according to claim 1 wherein said water propulsion systems are linear flow water jets.

7. An apparatus according to claim 1 wherein said water propulsion systems are propeller driven propulsion modules.

8. A power drive watercraft having a longitudinal axis, comprising:
    means defining transversely aligned right and left water propulsion systems attached to the rear portion of the watercraft and each supporting a water propulsion module;
    first power means for moving said right and left propulsion systems between an operative position within the water and a stowed position above the water;
    second power means carried by the watercraft for driving said right and left water propulsion system for propelling the watercraft up to the speed of at least twenty miles per hour when supported by water; said watercraft being a tracked amphibious vehicle;
    said vehicle having a forward end, a rear end and a bottom planing hull;
    means defining a bow flap mounted on the forward end of said vehicle for movement between a raised stowed position when in a land mode and a lowered water planing position when in the water mode; and
    means defining a transome flap mounted on the rear end of the vehicle and movable between a raised stowed position closing the rear end of the vehicle and a lowered planing position substantially in planar alignment with said planing hull;

said bow flap, said planing hull, and said transome flap cooperating to provide sufficient lift to allow said vehicle to move at a speed in excess of 20 miles per hour when in the water mode.

9. An apparatus according to claim 8 and additionally comprising third power means for moving said bow flap between said stowed position and said lowered water planing position; and fourth power means for moving said transom flap between said raised stowed position and said lowered planing position.

10. An apparatus according to claim 8 and additionally comprising transversely aligned hydrofoils secured to associated ones of said transversely aligned water propulsion systems for adding additional lift to the vehicle when traveling in excess of 20 miles per hour.

11. An apparatus according to claim 8 wherein said water propulsion systems are linear flow water jets.

12. An apparatus according to claim 8 wherein said water propulsion systems are propeller driven propulsion modules.

13. In a power driven watercraft having a hull including side walls and a rear end, the improvement which comprises:

means defining a pair of power driven water propulsion water modules;

means defining a pair of motors connected to said side walls at locations adjacent only the rear end of said watercraft;

means defining a pair of mounting legs connected between an associated motor means and an associated water propulsion module wherein energization of said motor means in one direction moves and locks said associated water propulsion modules in stowed positions above the level of the rear end of the watercraft, and when energized in the opposite direction lowers and locks said water propulsion modules in operative water propulsion positions below water level alongside said side walls and adjacent only the rear end of the watercraft; and hydrofoil means connected to said water propulsion modules defining apexes between said associated mounting legs and said associated hydrofoils, each of which are at an angle of about 90° to each other, which hydrofoils project outwardly from the adjacent side walls when in said operative water propulsion position for providing additional lift when said water propulsion modules move said vehicle from zero velocity through a velocity in excess of 20 miles per hour.

14. A power driven watercraft having a longitudinal axis, comprising:

means defining transversely aligned right and left water propulsion systems attached only to rear portions of side walls of the watercraft, each system supporting a water propulsion module, and each system including a mounting leg and a hydrofoil extending substantially perpendicular to each other and defining an apex therebetween;

first power means connected between said watercraft and associated ones of said mounting legs for moving said right and left propulsion systems between an operative position within the water and a stowed position above the water;

second power means carried by said watercraft and disposed at said apexes for driving said right and left water propulsion systems for propelling the watercraft at speeds up to at least 20 miles per hour when supported by water;

means included in said vehicle defining a forward end, a rear end and a bottom planing hull;

means defining a bow flap mounted on the forward end of said vehicle for movement between a raised stowed position when in a land mode and a lowered water planing position when in a water mode; and means defining a transome flap mounted on the rear end of the vehicle and movable between a raised stowed position closing the rear end of the vehicle and a lowered planing position substantially in planar alignment with said planing hull; said bow flaps, said planing hull, and said transome flap cooperating with said hydrofoils when in said water mode to provide sufficient lift to allow said vehicle to move at a speed in excess of 20 miles per hour when in said water mode.

* * * * *